(12) United States Patent
Kim et al.

(10) Patent No.: US 7,435,211 B2
(45) Date of Patent: Oct. 14, 2008

(54) BALL BALANCER FOR VERTICAL ROTOR AND CENTRIFUGE

(75) Inventors: Young Cheol Kim, Daejeon (KR); An Sung Lee, Daejeon (KR); Byung Ok Kim, Daejeon (KR)

(73) Assignee: Korea Institute of Machinery & Materials (KR)

( * ) Notice: Subject to any disclaimer, the term of this patent is extended or adjusted under 35 U.S.C. 154(b) by 0 days.

(21) Appl. No.: 11/617,917

(22) Filed: Dec. 29, 2006

(65) Prior Publication Data

US 2007/0225143 A1 Sep. 27, 2007

(30) Foreign Application Priority Data

Mar. 23, 2006 (KR) .................. 10-2006-0026670
Mar. 24, 2006 (KR) .................. 10-2006-0027140
Mar. 24, 2006 (KR) .................. 10-2006-0027141

(51) Int. Cl.
 *B04B 5/02* (2006.01)
 *B04B 9/14* (2006.01)

(52) U.S. Cl. ..................... 494/82; 74/572.4

(58) Field of Classification Search ......... 494/1, 494/10, 12, 16–21, 33, 82, 84; 73/457–458; 210/85, 144; 68/23.1, 23.2; 74/570.2, 571.1, 74/572.4
See application file for complete search history.

(56) References Cited

U.S. PATENT DOCUMENTS 1,254,694 A * 1/1918 Humphries ............... 74/570.2
2,336,973 A * 12/1943 Wemp ..................... 74/570.2
3,692,236 A * 9/1972 Livshitz et al. ............ 494/20
4,547,185 A * 10/1985 Hellekant ................... 494/37
5,605,078 A * 2/1997 Taylor et al. .............. 74/571.1
6,116,112 A * 9/2000 Sohn ......................... 74/570.2
6,132,354 A * 10/2000 Ohtsu et al. ................ 494/16
2004/0003678 A1* 1/2004 Neubauer et al. .......... 74/573 R
2007/0225143 A1* 9/2007 Kim et al. .................. 494/82

FOREIGN PATENT DOCUMENTS

| GB | 2359772 A | * | 9/2001 |
| JP | 59-183846 | * | 10/1984 |
| JP | 02203949 A | * | 8/1990 |
| JP | 11156243 A | * | 6/1999 |
| WO | 00/29122 | * | 5/2000 |

* cited by examiner

*Primary Examiner*—Charles E Cooley
(74) *Attorney, Agent, or Firm*—Cantor Colburn LLP

(57) ABSTRACT

Disclosed herein are a balancer which is provided with a curved portion at a balancing space so that movement of balls is accelerated at the moment a rotational speed of a rotor exceeds a resonant speed, thereby stabilizing the rotation of the rotor without vibration regardless of when the rotational speed of the rotor is less or more than the resonant speed, and a centrifuge using the above balancer. The balancer includes a body which is formed with a balancing space thereinside. The balancing space has a circular circumference, and is defined by a bottom portion, a slanted portion extending upward from the bottom portion, a curved portion formed at an end of the slanted portion, and an upper large-diameter portion extending from the curved portion. The balancer further includes a plurality of balls which are contained in the balancing space.

14 Claims, 13 Drawing Sheets

(a) (b) (c)

BALL BALANCER FOR VERTICAL ROTOR AND CENTRIFUGE

BACKGROUND OF THE INVENTION

1. Field of the Invention

The present invention relates to a balancer and a centrifuge using the same, and more particularly to a balancer which is provided with a curved portion at a balancing space so that movement of balls is accelerated at the moment a rotational speed of a rotor exceeds a resonant speed, thereby stabilizing the rotation of the rotor without vibration regardless of when the rotational speed of the rotor is less or more than the resonant speed, and to a centrifuge using the above balancer to secure the stable rotation of the rotor.

2. Description of the Related Art

Unbalance generally exists at a rotor of a rotating machine, and the unbalance affects adversely a rotational speed, and causes vibration and noise. In order to stabilize unstable rotation of a rotor due to unbalance, a balancer is mounted to the rotor.

Especially, a high-speed rotor, e.g., used in a centrifuge has relatively large unbalance. In such a high-speed rotor, a ball balancer is used for preventing reduction of a rotational speed and generation of vibration and noise due to the unbalance.

FIGS. 18 and 19 illustrate examples of a conventional ball balancer.

A ball balancer illustrated in FIG. 18 includes a casing 10 which has a balancing space 30 of an annular shape, and a plurality of balls 20 which are provided in the balancing space 30. The casing 10 is formed with a shaft hole 40 at its center portion, through which a rotating shaft is fixedly coupled.

In the conventional ball balancer structured as above, the number of the balls 20 is provided to an extent of occupying a portion of the balancing space 30. When a rotational speed of a rotor is higher than a resonant speed, the balls 20 are moved to an opposite direction to an unbalance position, thereby balancing the rotor and stabilizing the rotation. However, when the rotational speed of the rotor is lower than the resonant speed, the balls 20 are moved to the unbalance position, thereby further destabilizing the rotation of the rotor.

In order to solve the above problem, another conventional ball balancer structured as illustrated in FIG. 19 has been developed.

The conventional ball balancer illustrated in FIG. 19 includes a hollow casing 10a, and a plurality of balls 20a provided in a balancing space 30a which is defined by an inner surface of the casing 10a such that the inner bottom surface of the casing 10a is slanted downward from a center portion to a circumference. The number of the balls 20a are provided to an extent of filling a recess of the balancing space 30a formed along the inner circumference of the casing 10a. A non-described reference numeral 40a is a shaft hole formed at the center portion of the casing 10a, through which a rotating shaft is fixedly coupled.

In the conventional ball balancer structured as above, when a rotational speed of a rotor is lower than a resonant speed, the balls 20a are located equidistantly from the center of rotation. Accordingly, the unstable rotation caused by the ball balancer in FIG. 18 at the low rotational speed can be prevented.

Also, when the rotor is rotated at a high speed, the balls 20a take off and are moved to an opposite direction to an unbalance position, thereby stabilizing the rotation of the rotor, and decreasing vibration and noise.

However, the conventional ball balancer in FIG. 19 has a shortcoming that it takes much time for the balls 20a to move to the opposite direction to the unbalance position when the rotational speed of the rotor is increased to exceed the resonant speed, and vibration is generated at this moment. Therefore, the conventional ball balancer does not have a sufficient vibration damping effect.

The aforesaid balancer is used in a high-speed rotating machine like a centrifuge. A centrifuge is a machine that spins mixtures of different substances around very quickly so that they separate by a centrifugal force. As shown in FIG. 20, a centrifuge includes an outer case 700, a damper 200 which is mounted to a supporting plate 701 formed at an inner surface of the outer case 700, a motor 300 which is mounted to a bracket 302 supported elastically by the damper 200, and a rotor 400 which is mounted to a rotating shaft 301 of the motor 300. The rotor 400 is formed with a plurality of chambers, in which bottles or test tubes containing samples to be centrifuged are disposed.

In the centrifuge structured as above, by the motor 300 being driven at high speed, a centrifugal force is exerted to the samples in the bottles or the test tubes which are disposed in the chambers, so that substances contained in the sample separate by the centrifugal force due to a difference of density.

In order to apply the strong centrifugal force to the samples, the motor 300 and the rotor 400 must be rotated at high speed. And, for smooth operation of the centrifuge, vibration should not be generated.

However, the rotor generally has unbalance, and the unbalance affects adversely a rotational speed of the rotor and causes vibration. The unbalanced rotation of the rotor deteriorates a centrifuging effect. When the rotational speed of the rotor of the centrifuge is more than a resonant speed, the substances contained in the sample separate by a difference of density. Then, by decreasing the rotational speed gradually, the separated substances are prevented from being remixed. However, if vibration is generated at the rotor in the above centrifuging process, the separated substances are remixed.

Therefore, it is important to continuously prevent the generation of vibration while the rotational speed of the rotor is increased or decreased. But, the conventional centrifuge has a drawback that vibration is generated at the moment the rotational speed of the rotor is decreased below the resonant speed and the separated substances are remixed. Although the conventional centrifuge includes the damper to solve the vibration problem, the damper cannot absorb the vibration sufficiently.

SUMMARY OF THE INVENTION

Therefore, the present invention has been made in view of the above problems, and it is an object of the present invention to provide a balancer which can decrease vibration by stabilizing rotation of a rotor regardless of when a rotational speed of the rotor is a resonant speed, or less or more than the resonant speed, and to provide a centrifuge using the above balancer.

It is another object of the present invention to provide a balancer which is provided with a curved portion at a balancing space so that balls can move rapidly to an opposite direction to an unbalance position when a rotational speed of a rotor exceeds a resonant speed, thereby stabilizing rotation of a rotor regardless of the rotational speed of the rotor, and to provide a centrifuge using the above balancer.

It is a further object of the present invention to provide a balancer which partitions a balancing space into multi-layers and achieves balancing performance by balls contained in the respective layers of the balancing space, thereby promoting the stability of rotation of a rotor, and to provide a centrifuge using the above balancer.

It is yet another object of the present invention to provide a balancer which contains metal particles in a balancing space, thereby minimizing transient response time, i.e., time required to stabilize the rotation of a rotor, and to provide a centrifuge using the above balancer.

In accordance with an aspect of the present invention, the above and other objects can be accomplished by the provision of a balancer for a vertical rotor, which keeps balance of the rotor in rotation of the rotor, comprising: a body which is formed with a balancing space inside the body, the balancing space having a circular circumference, and being defined by a bottom portion, a slanted portion extending upward from the bottom portion, a curved portion formed at an end of the slanted portion, and an upper large-diameter portion extending from the curved portion; and a plurality of balls which are contained in the balancing space.

In accordance with another aspect of the present invention, the above and other objects can be accomplished by the provision of a centrifuge which includes an outer case, a damper mounted to a supporting plate formed at an inner surface of the outer case, a motor mounted to a bracket supported by the damper, and a rotor mounted to a rotating shaft of the motor, the rotor having buckets hingedly coupled to the rotor or a plurality of chambers, being characterized in that: the rotor is provided with a balancer, the balancer including: a body which is formed with a balancing space inside the body, the balancing space having a circular circumference, and being defined by a bottom portion, a slanted portion extending upward from the bottom portion, a curved portion formed at an end of the slanted portion, and an upper large-diameter portion extending from the curved portion; and a plurality of balls which are contained in the balancing space.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings.

FIGS. 1 to 11 illustrate respectively different structures and operations of a ball balancer in accordance with the present invention.

As shown in FIGS. 1 to 10, a ball balancer according to the present invention includes a body 1 which is formed with a balancing space 12, and a plurality of balls 2 which are stored in the balancing space 12.

Figure 1:
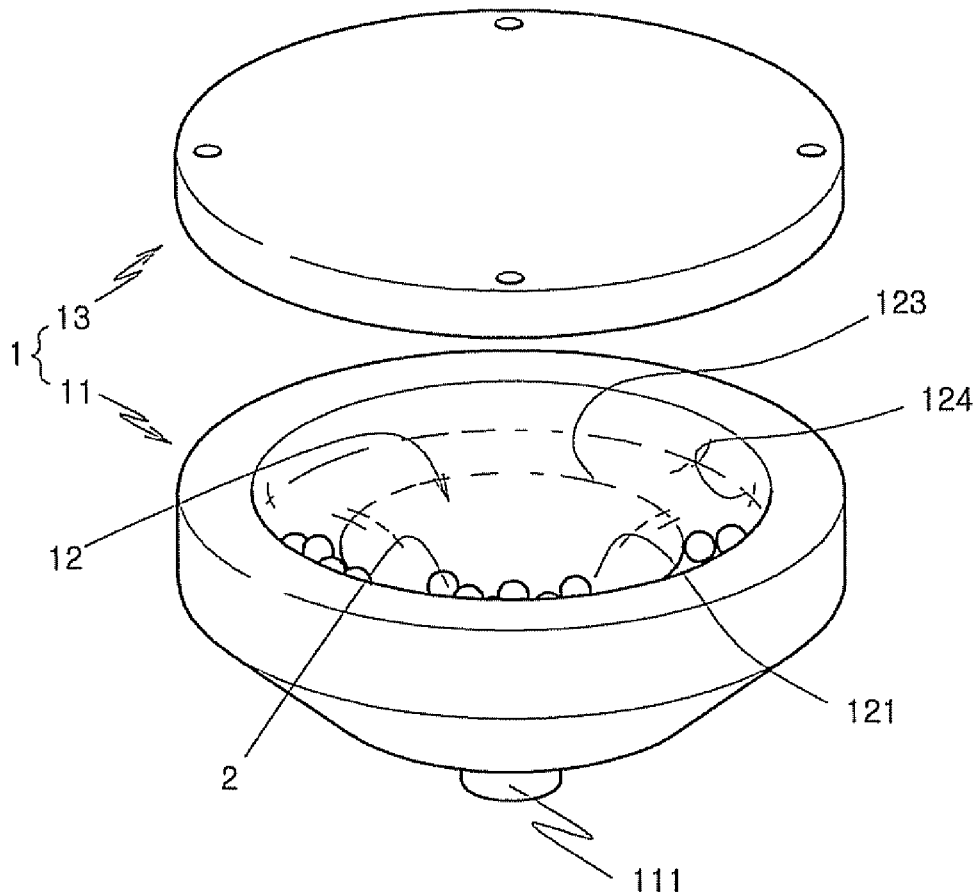
FIG. 1 is a perspective view illustrating a balancer for a vertical rotor in accordance with an exemplary embodiment of the present invention.
Figure 2:
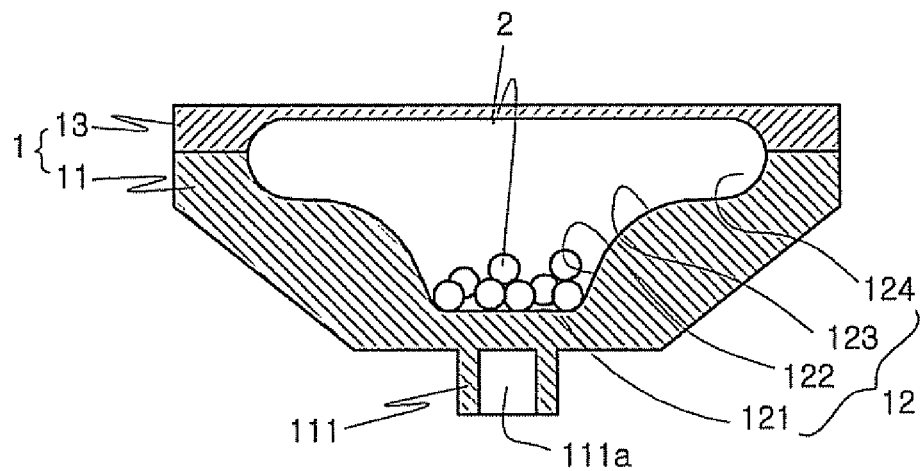
FIG. 2 is a sectional view illustrating a balancer for a vertical rotor depicted in FIG. 1.

The body 1, as shown in FIGS. 1 and 2, is formed in a hollow cylindrical shape, and formed with a shaft connecting part 111 having a shaft hole 111a to which a rotor is connected.

The balancing space 12 is formed at the body 1 to have a circular circumference such that a cross-sectional area gradually becomes wider from a lower portion to an upper portion. More particularly, the balancing space 12 is defined by a bottom portion 121, a slanted portion 122 which extends upward broadly from the bottom portion 121, a curved portion 123 which is convexly formed at an end of the slanted portion 122 toward a center of the body 1, and an upper large-diameter portion 124 which extends from an end of the curved portion 123.

Accordingly, the balancing space 12 is formed in an overall trumpet shape. Especially, the diameter becomes abruptly large between the curved portion 123 and the upper large-diameter portion 124.

The body 1 includes a lower main body 11, and an upper cover 13 which is detachably coupled to an upper portion of the main body 11, so as to easily put or pull the balls 2 into/out of the main body 11.

In other words, the cover 13 is coupled to a top surface of the main body 11 which is formed around the upper large-diameter portion 124 of the balancing space 12, to shield the balancing space 12.

Preferably, the cover 13 may be fixed to the top surface of the main body 11 by fixing means like a screw.

The bottom portion 121 of the balancing space 12 may be formed in a semispherical shape.

In case that the slanted portion 122 extends from the semispherical-shaped bottom portion 121, the ascent from the bottom portion 121 to the curved portion 123 is formed gently, so that the balls 2 can be moved more smoothly when the rotation of the rotor is accelerated.

Figure 5:
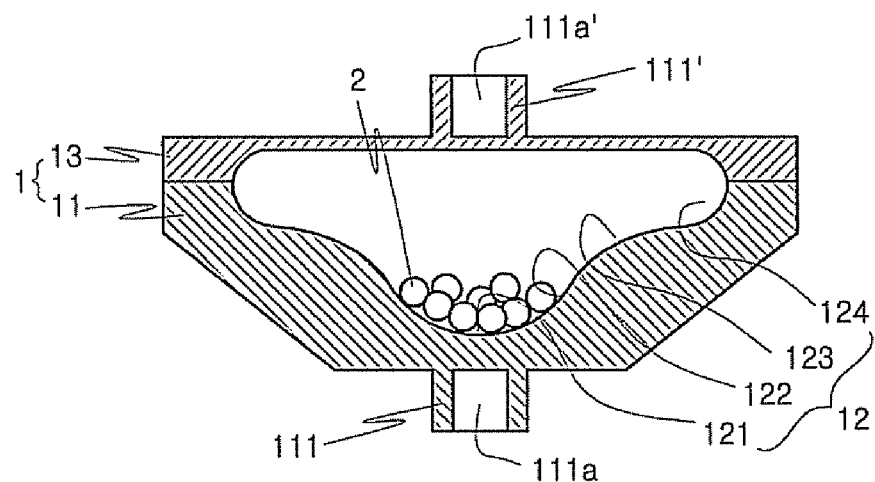

As shown in FIG. 5, both the main body 11 and the cover 13 may be respectively formed with shaft connecting parts 111 and 111' at centers of outer surfaces thereof, so that the ball balancer can be installed regardless of the location of the rotor.

In other words, when the balancer is mounted over the rotor, the rotor is connected to the shaft connecting part 111 formed at the main body 11. On the other hand, when the balancer is mounted below the rotor, the rotor is connected to the shaft connecting part 111' formed at the cover 13.

Figure 6:
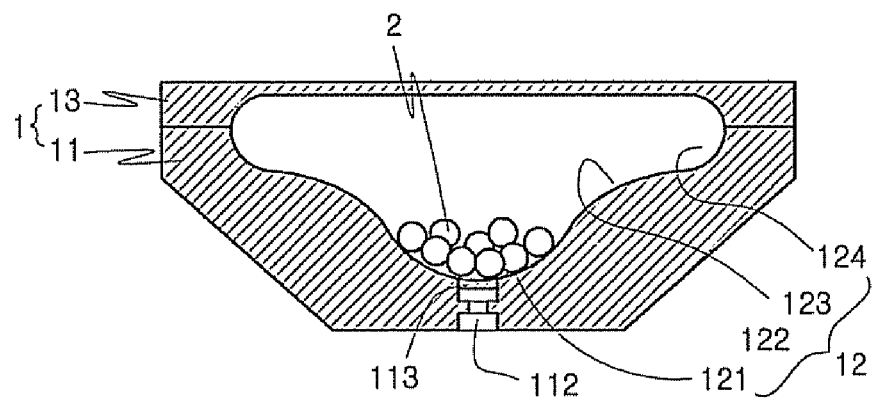

Also, as shown in FIG. 6, a shaft hole 112 may be formed through the bottom portion 121 of the main body 11, into which a rotating shaft is coupled, and a stopper 113 may be inserted into an upper portion of the shaft hole 112 such that the stopper 113 is disposed on the same plane with the bottom portion 121.

As described above, the rotating shaft of the rotor is coupled into the shaft hole 112 formed through the bottom portion 121, and the stopper 113 is inserted into the shaft hole 112 to prevent the rotating shaft from being exposed from the bottom portion 121. At this time, the stopper 113 should be disposed on the same plane with the surface of the bottom portion 121 so that the balls 2 can be moved smoothly.

Also, when the bottom portion 121 is formed in the semi-spherical shape, the surface of the stopper 113 is formed in an arc shape corresponding to the shape of the bottom portion 121 so that the balls 2 can be moved smoothly.

The above-described shaft connecting structures 111, 111' and 112 may be modified diversely.

FIGS. 7 to 10 illustrate various modifications of the balancer according to the present invention.

Figure 7:
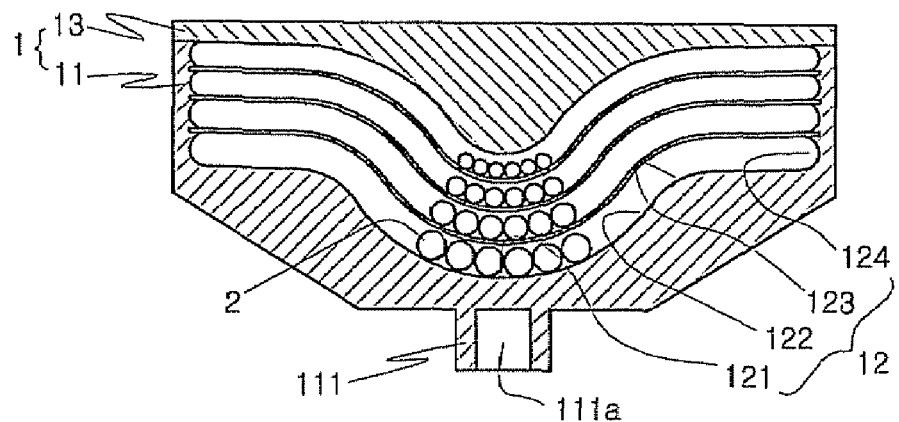

The balancer illustrated in FIG. 7 includes a multi-layered balancing space 12. The balancing space 12 is formed at the body 1 to have a circular circumference, and partitioned into multi-layers. And, a plurality of balls 2 are stored in the respective layers of the balancing space 12.

Each layer of the balancing space 12 is formed such that a cross-sectional area gradually becomes wider from a lower portion to an upper portion, and more particularly, is defined by a bottom portion 121, a slanted portion 122 which extends upward broadly from the bottom portion 121, a curved portion 123 which is convexly formed at an end of the slanted portion 122 toward a center of the body 1, and an upper large-diameter portion 124 which extends from an end of the curved portion 123.

The balls 2 stored in one layer of the balancing space 12 may be the same or different as/from the balls 2 stored in another layer of the balancing space 12. For example, heights of the layers of the balancing space 12 become gradually lower from the lowermost layer to the uppermost layer, and accordingly sizes of the balls 2 contained in the respective layers of the balancing space 12 also become smaller. By arranging the balls 2 having the different sizes in the layers of the balancing space 12 as described above, the relatively small balls 2 contained in the upper-disposed layers of the balancing space 12 can enhance the balancing performance of the relatively large balls 2 contained in the lower-disposed layers of the balancing space 12, thereby acquiring the more rapid balancing effect.

Figure 8:
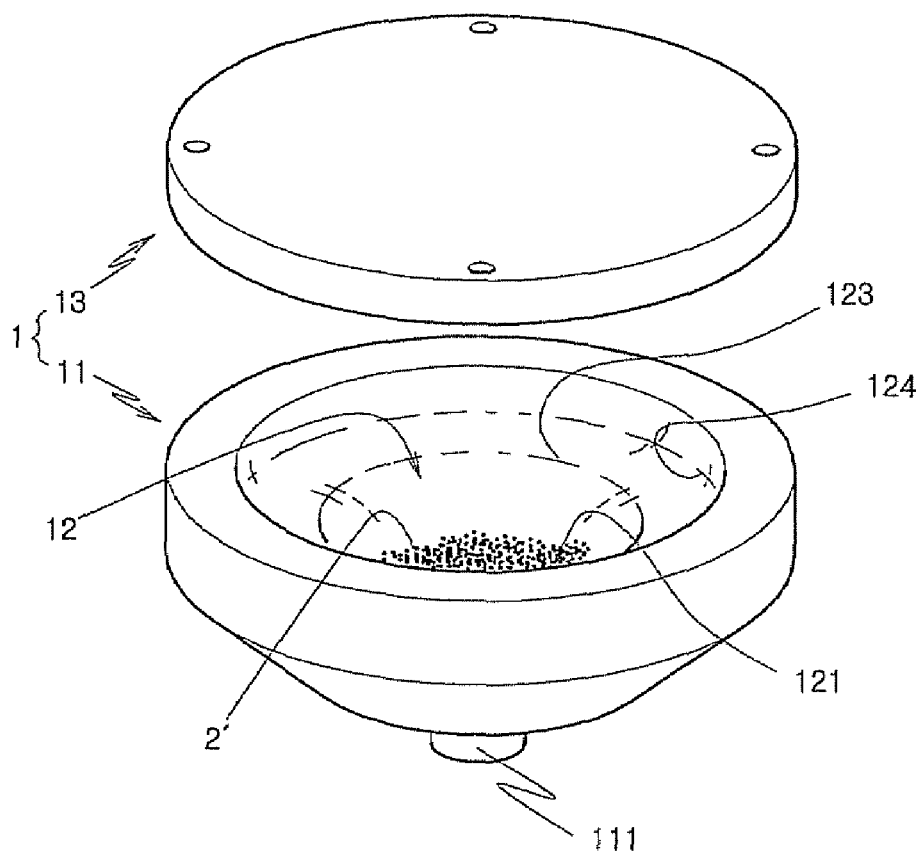
FIG. 8 is a perspective view illustrating a balancer for a vertical rotor in accordance with another exemplary embodiment of the present invention.
Figure 9:
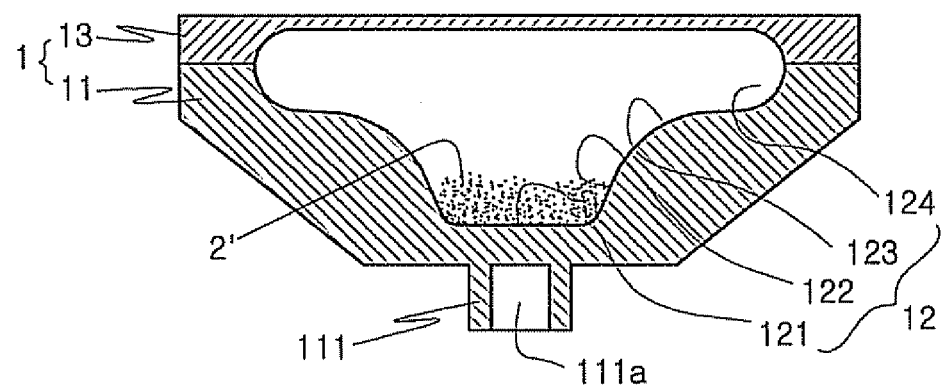
FIG. 9 is a sectional view illustrating a balancer for a vertical rotor depicted in FIG. 8.
Figure 10:
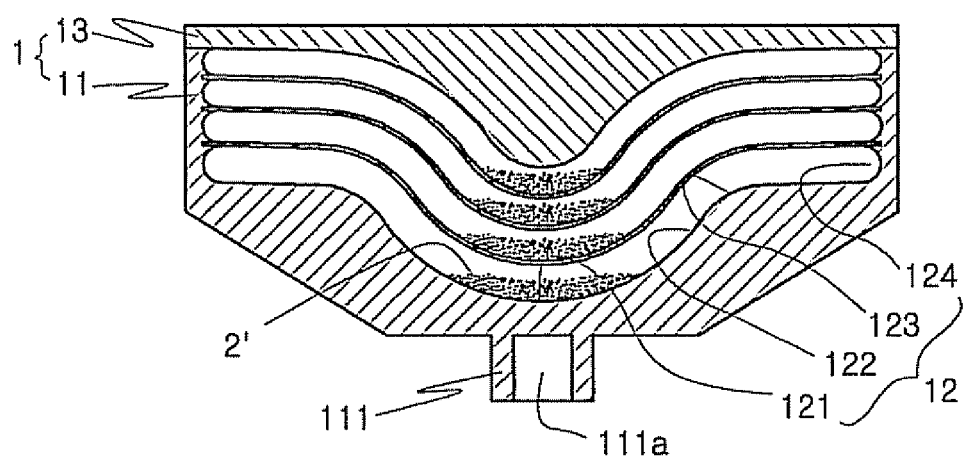
FIG. 10 is a sectional view illustrating a modification of a balancer for a vertical rotor in accordance with the present invention.

Also, as shown in FIGS. 8 to 10, the balancer according to the present invention may be configured such that a plurality of metal particles 2' having a very small diameter are contained in the balancing space 12.

Preferably, the diameter of the metal particles 2' is in the range of 0.2 mm to 2.0 mm, so that an impact is not generated even at collision of the metal particles 2'. Accordingly, transient response time, i.e., time required to stabilize the rotation of the rotor is minimized, as compared to when the large balls (see FIGS. 1 to 7) are contained in the balancing space, thereby achieving the more rapid balancing effect.

If the diameter of the metal particles 2' is less than 0.2 mm, there is a problem that the metal particles 2' are scattered by the rotational force. On the other hand, if the diameter of the metal particles 2' is more than 2.0 mm, there is a problem that the transient response time becomes longer by the impact between the particles 2'. Therefore, it is preferable that the metal particles 2' have the diameter in the range of 0.2 mm to 2.0 mm.

Since the balancing space 12 formed at the body 1 of the balancer structured as above includes the curved portion 123 which is identical to the previous embodiment, the detailed description thereof will be omitted.

Also, the balancing space 12 may be partitioned into multi-layers as shown in FIG. 10, and a plurality of metal particles 2' may be contained in the respective layers of the balancing space 12. Since such a multi-layer structure of the balancing space 12 is identical to the aforesaid previous embodiment, the description thereof will also be omitted. In order to avoid a problem that the balancing effect may be deteriorated by the small metal particles 2' being adhered to the surface of the bottom portion 121 of the balancing space 12, it is preferable that the surface of the bottom portion 121 is formed to be as slippery as possible. To this end, the surface of the bottom portion 121 of the balancing space 12 is coated with diamond-like carbon (DLC) or TEFLON (polytetrafluoroethylene) which has a high lubrication force, so as to minimize friction with the metal particles 2' and secure the smooth movement of the metal particles 2'.

FIGS. 12 to 17 illustrate various examples of a centrifuge having the balancer structured as above.

Figure 12:
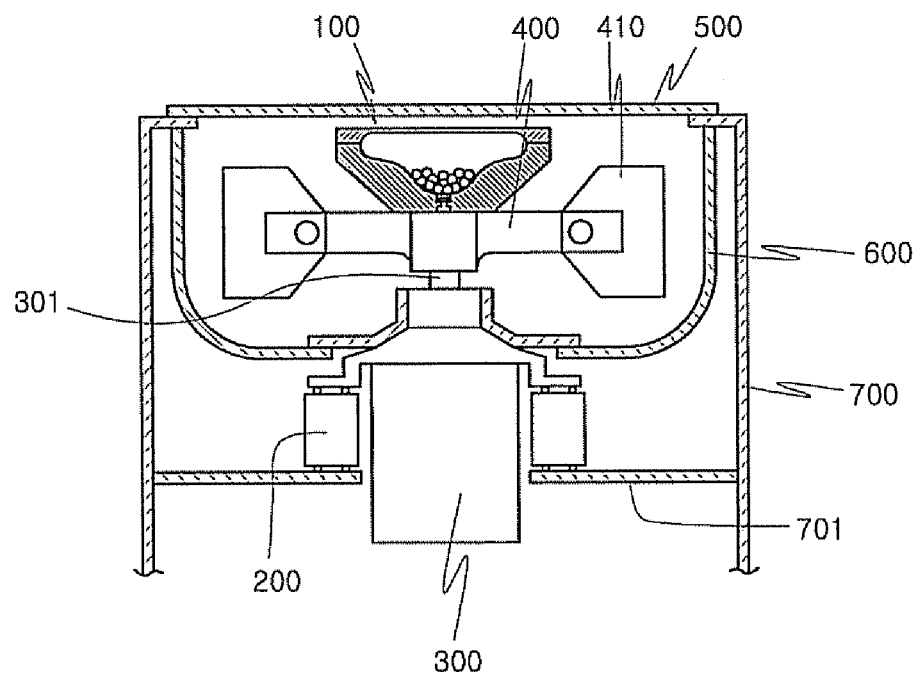
FIGS. 12 to 17 are sectional views illustrating various examples of a centrifuge in accordance with the present invention.
Figure 13:
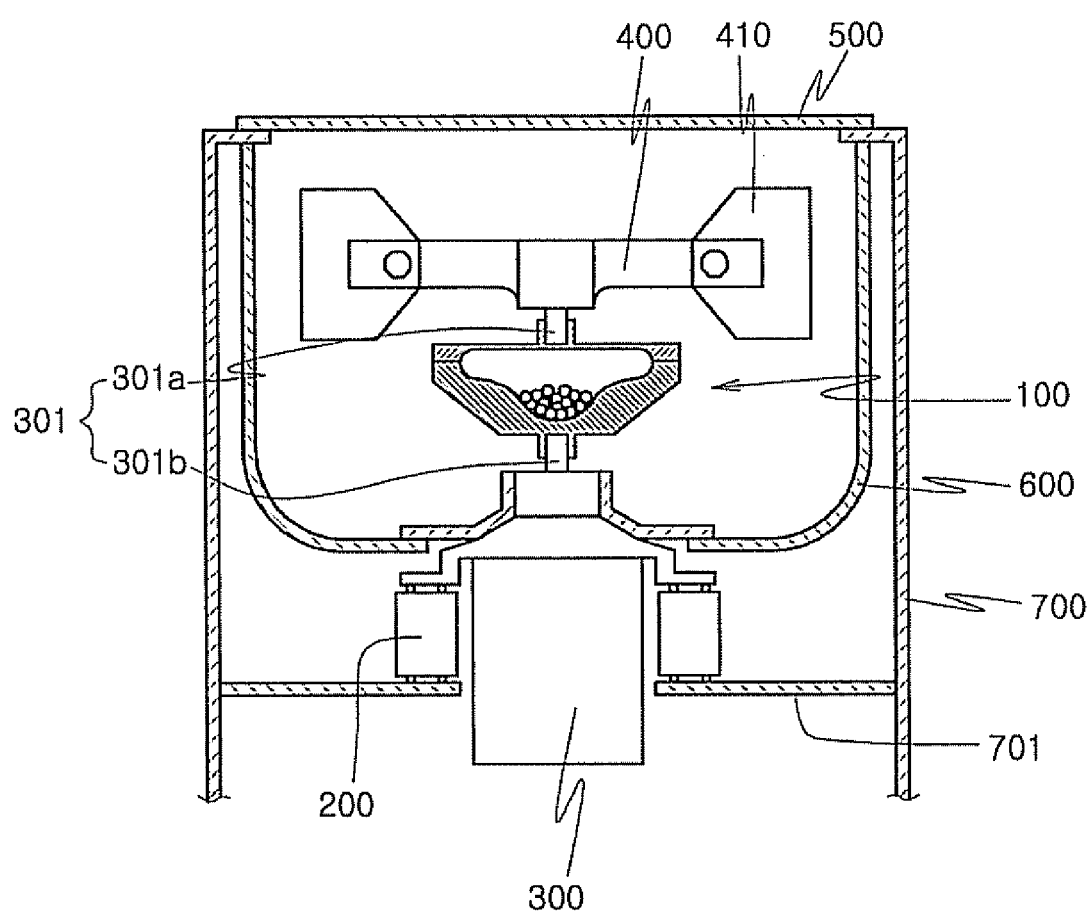
Figure 14:
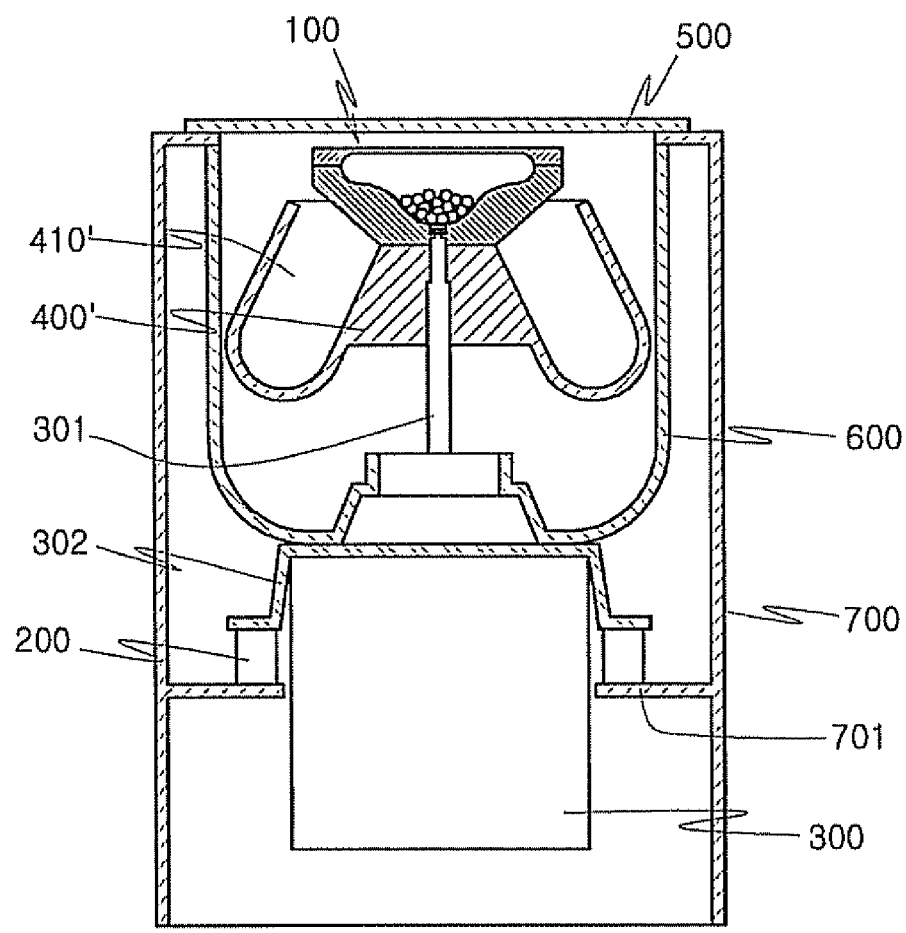
Figure 15:
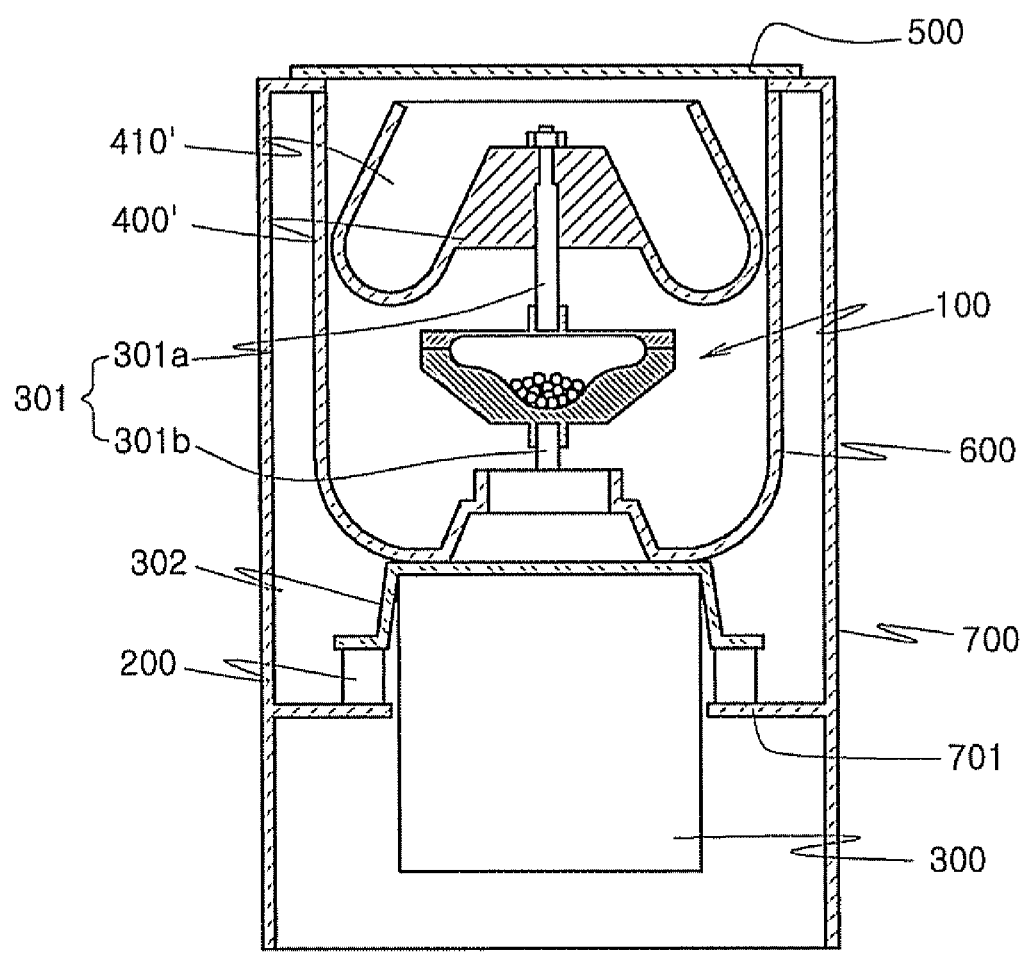
Figure 16:
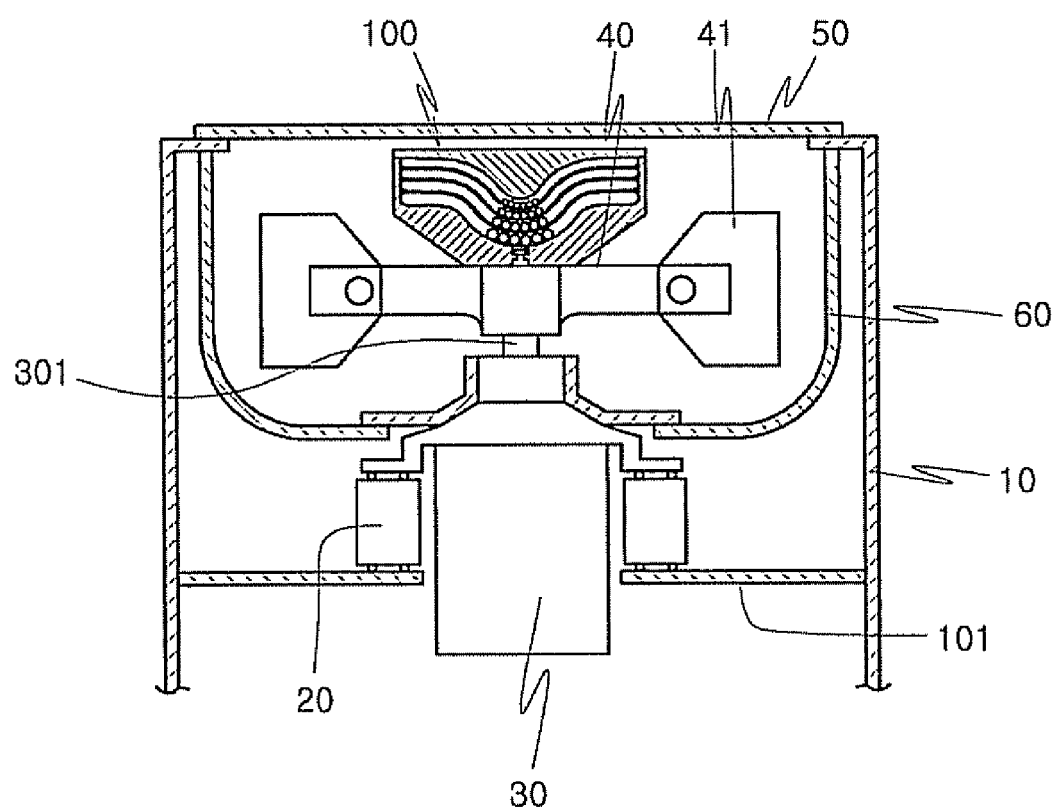
Figure 17:
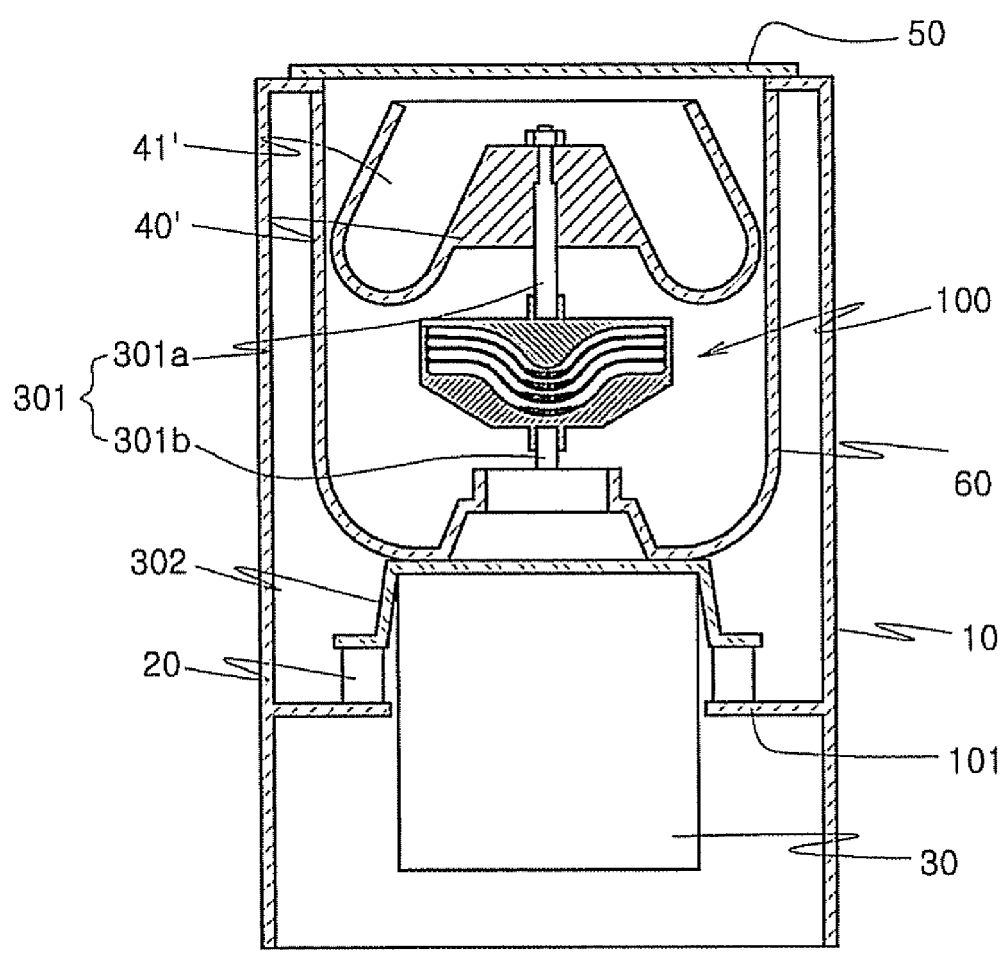
Figure 18:
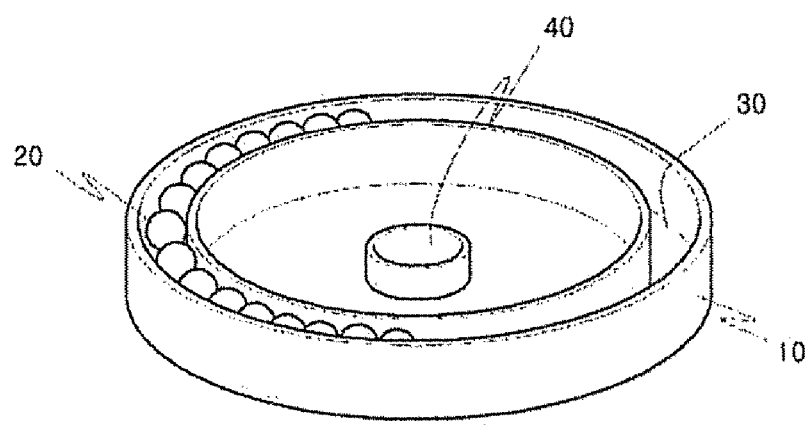
FIG. 18 is a perspective view illustrating an example of a conventional balancer for a vertical rotor.
Figure 19:
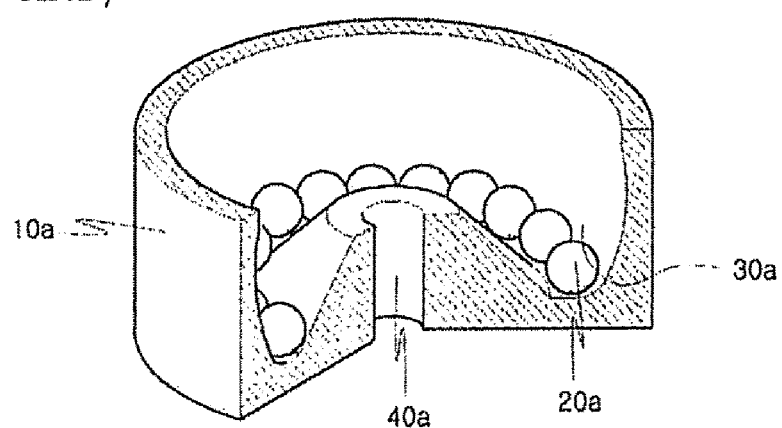
FIG. 19 is a perspective view illustrating another example of a conventional balancer for a vertical rotor.
Figure 20:
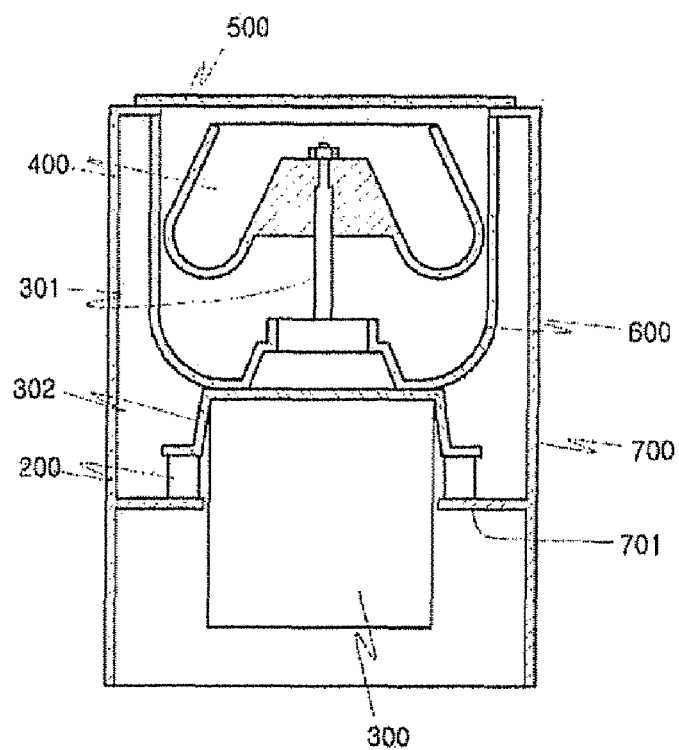
FIG. 20 is a sectional view illustrating an example of a conventional centrifuge.

FIGS. 12, 13 and 16 are sectional views illustrating examples of a swing type centrifuge, and FIGS. 14, 15 and 17 are sectional views illustrating examples of an angle type centrifuge.

A swing type centrifuge according to the present invention includes a balancer 100 mounted to an end of a rotating shaft 301 extending from a motor 300, to reduce vibration due to the rotation.

In the swing type centrifuge of the present invention, as shown in the drawings, a supporting plate 701 is formed at an inner surface of an outer case 700, and the motor 300 is supported by the supporting plate 701. A rotor 400 is mounted to the rotating shaft 301 extending from the motor 300.

A damper 200 is provided to absorb the vibration of the motor 300, and buckets 410 are hingedly coupled to ends of the rotor 400.

As the rotational force of the rotor 400 driven by the motor 300 is increased, the buckets 410 spread out about hinge portions by the centrifugal force.

The balancer 100 is mounted to a top of the rotor 400 or to a middle portion of the rotating shaft 301 for rotating the rotor 400.

The balancer 100 is one selected from the above-described embodiments of the balancer.

As described above, the balancer 100 has the curved portion 123 formed at the middle of the balancing space 12, and a plurality of balls 2 or a plurality of metal particles 2' contained in the balancing space 12. The balancing space 12, as shown in FIGS. 16 and 17, may be partitioned into multi-layers.

Referring to FIGS. 13, 15 and 17, an angle type centrifuge will now be described.

The angle type centrifuge includes a motor 300, a rotor 400' which is mounted to a rotating shaft 301 driven by the motor 300, and a plurality of chambers 410' which are formed at the rotor 400'. The chambers 410' are shaped to be expanded as they progress downward.

The balancer 100 is mounted to the rotating shaft 301 or the rotor 400'. More particularly, the balancer 100 may be mounted to a top of the rotating shaft 301, or mounted between an upper shaft 301a and a lower shaft 301b, into which the rotating shaft 301 is divided.

In order to fix the balancer 100 to the top of the rotating shaft 301, a shaft connecting hole is formed at the lower surface of the balancer 100. On the other hand, in order to fix the balancer 100 between the upper shaft 301a and the lower shaft 301b of the rotating shaft 301, shaft connecting holes are formed at the upper and lower surfaces of the balancer 100.

Since the concrete constitution of the balancers 100 installed to the respective embodiments of the centrifuge has been described above, the detailed description thereof will be omitted. Also, since an overall structure and an operation of the centrifuge are the same as the conventional centrifuge, the description thereof will be omitted.

Hereinafter, operation of the ball balancer and the centrifuge according to the present invention will be described.

Figure 3A:
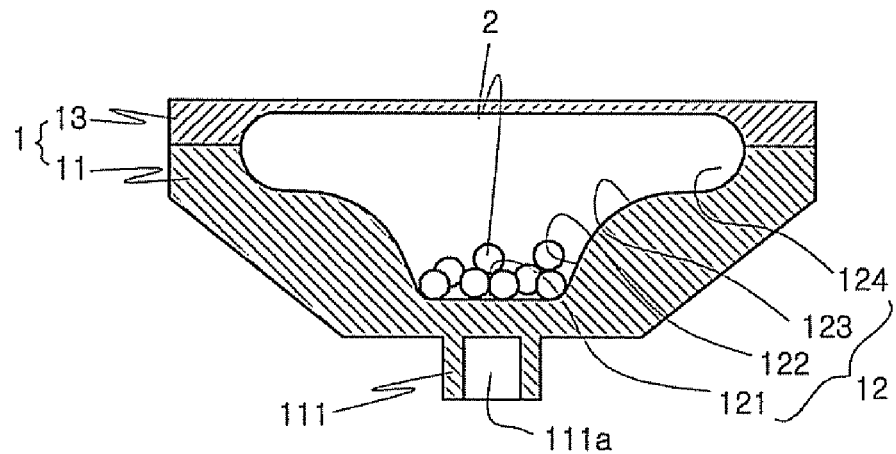
FIG. 3a is a sectional view illustrating an operating state of a balancer for a vertical rotor depicted in FIG. 1 when a rotor is rotated at a lower speed than a resonant speed.
Figure 3B:
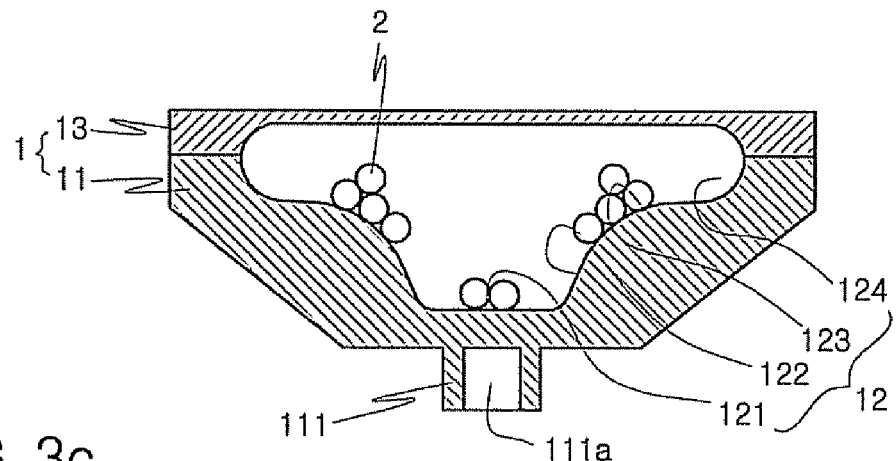
FIG. 3b is a sectional view illustrating an operating state of a balancer for a vertical rotor depicted in FIG. 1 when a rotor is rotated at a resonant speed.
Figure 3C:
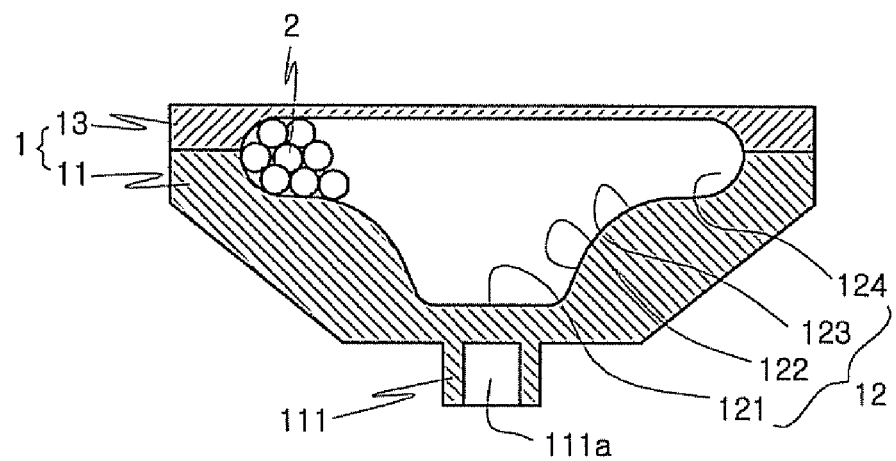
FIG. 3c is a sectional view illustrating an operating state of a balancer for a vertical rotor depicted in FIG. 1 when a rotor is rotated at a higher speed than a resonant speed.
Figure 4:
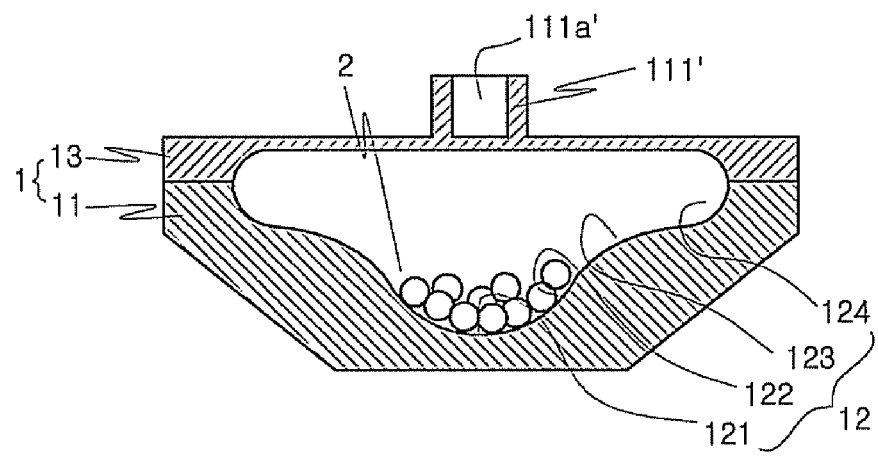
FIGS. 4 to 7 are sectional views illustrating modifications of a balancer for a vertical rotor in accordance with the present invention.
Figure 11:
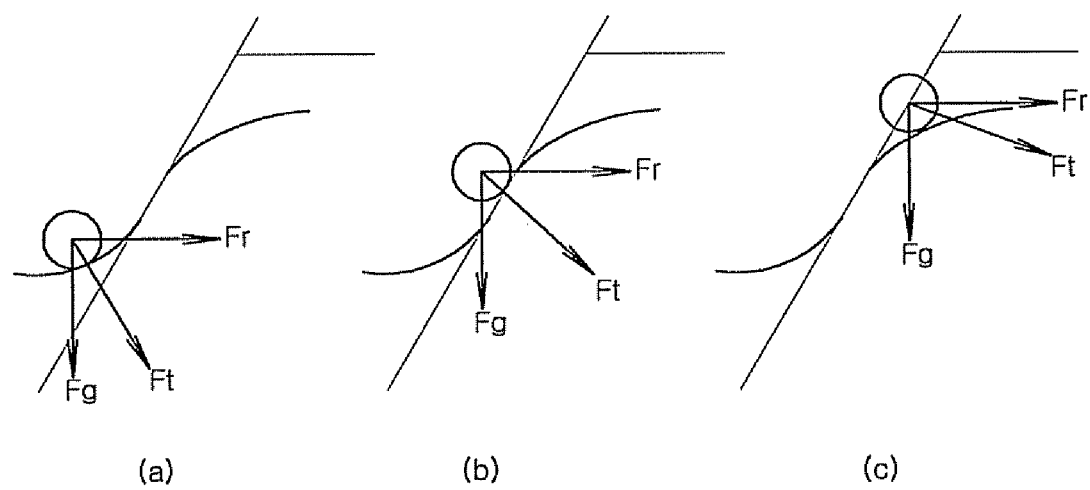
FIG. 11 is a view illustrating a relationship between movement of a ball according to a rotational speed and a direction of a force applied to the ball.

FIGS. 3a to 3c illustrate the operating state of the ball balancer according to the present invention, and FIG. 11 is a view illustrating a relationship between movement of the ball according to a rotational speed and a direction of a force applied to the ball.

If the rotor starts to rotate and the rotational speed is lower than the resonant speed, as shown in FIG. 3a, the balls 2 are evenly distributed at the center portion of the balancing space 12. And, as shown in FIG. 11(a), the force applied to the balls 2 is directed in a resultant direction of a gravity Fg and a centrifugal force Fr. More particularly, the resultant force is exerted in the direction closer to the direction of the gravity Fg rather than the direction of the centrifugal force Fr.

Accordingly, the balancer can rotate stably by the balanced distribution of the balls.

If the rotation of the rotor is accelerated, the rotational speed of the balancer is also increased, and the balls 2 are subjected to move outwardly by the centrifugal force. At this time, because the balls 2 move along the slanted portion 122 formed at the balancing space 12, the resultant force of the gravity Fg and the centrifugal force Fr is applied to the balls 2, as shown in FIG. 11(b), in the direction perpendicular to the surface of the slanted portion 122. Such a resultant force functions of settling the balancer down, so that the balancer can rotate stably.

If the rotation of the rotor is further accelerated, as shown in FIG. 3c, the balls 2 move to the curved portion 123 along the slanted portion 122. At this time, the resultant force of the gravity Fg and the centrifugal force Fr is applied to the balls 2, as shown in FIG. 11(c), in the direction approximate to the direction of the centrifugal force Fg. Accordingly, the balls 2 rapidly pass by the curved portion 123, and reach the upper large-diameter portion 124.

In the above course, the force applied to the balls 2 functions of settling the balancer down, so that the balancer can rotate stably. Also, when the rotational speed exceeds the resonant speed, the balls 2 instantly move to the direction opposite to the unbalance position. Accordingly, the rotation is stabilized, and the vibration and noise can be reduced.

Next, the operation of the centrifuge having the balancer according to the present invention will be described.

If the rotating shaft 301 driven by the motor 300 starts to rotate and the rotational speed is lower than the resonant speed, the balls 2 are evenly distributed at the center portion of the balancing space 12. And, the force applied to the balls 2 is directed in a resultant direction of the gravity and the centrifugal force. More particularly, the resultant force is exerted in the direction close to the direction of the gravity.

Accordingly, the balancer can rotate stably by the balanced distribution of the balls.

If the rotation of the rotating shaft 301 is accelerated, the rotational speed of the balancer 100 is also increased, and the balls 2 are subjected to move outwardly by the centrifugal force. At this time, because the balls 2 move along the slanted portion 122 formed at the balancing space 12, the resultant force of the gravity and the centrifugal force is applied to the balls 2 in the direction perpendicular to the surface of the slanted portion 122. Such a resultant force functions of settling the balancer 100 down, so that the balancer 100 can rotate stably.

If the rotation of the rotating shaft 301 is further accelerated, the balls 2 move to the curved portion 123 along the slanted portion 122. At this time, the resultant force of the gravity and the centrifugal force is applied to the balls 2 in the direction approximate to the direction of the centrifugal force. Accordingly, the balls 2 rapidly pass by the curved portion 123, and reach the upper large-diameter portion 124.

In the above course, the force applied to the balls 2 functions of settling the balancer down, so that the balancer can rotate stably. Also, when the rotational speed exceeds the resonant speed, the balls 2 instantly move to the direction opposite to the unbalance position. Accordingly, the rotation is stabilized, and the vibration and noise can be reduced.

In other words, in the course of decelerating the rotation of the rotor as well as accelerating the rotation of the rotor, the vibration is not generated, and so the separated substances in the centrifuge are prevented from being remixed.

As apparent from the above description, the balancer according to the present invention can decrease vibration by stabilizing the rotation of the rotor regardless of when the rotational speed of the rotor is the resonant speed, or less or more than the resonant speed.

Also, since the curved portion is formed at the balancing space so that the balls can move rapidly to the opposite direction to an unbalance position when the rotational speed of the rotor exceeds the resonant speed, the rotation of the rotor can be stabilized regardless of the rotational speed of the rotor.

Also, by providing the metal particles in the balancing space, transient response time, i.e., time required to stabilize the rotation of the rotor can be minimized.

Further, by arranging the balls in the respective layers of the multi-layered balancing space, the balls contained in the upper-disposed layers of the balancing space can enhance the balancing performance of the balls contained in the lower-disposed layers of the balancing space, thereby acquiring the more rapid balancing effect.

Also, by installing the balancer having the above effects to the centrifuge, vibration of the rotor can be decreased by stabilizing the rotation of the rotor regardless of when the rotational speed of the rotating shaft of the centrifuge is the resonant speed, or less or more than the resonant speed. Further, by preventing the vibration of the rotor, the separated substances in the centrifuge can be prevented from being remixed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A balancer for a vertical rotor, which keeps balance of the rotor in rotation of the rotor, comprising:
   a body which is formed with a balancing space inside the body, the balancing space having a circular circumference, and being defined by a bottom portion, a slanted portion extending upward from the bottom portion, a curved portion formed at an end of the slanted portion, and an upper large-diameter portion extending from the curved portion; and a plurality of balls which are contained in the balancing space, wherein the balancing space is vertically partitioned into multi-layers, and wherein the balls contained in one layer of the balancing space are different in a diameter from the balls stored in another layer of the balancing space such that the diameters of the balls become larger from an uppermost layer to a lowermost layer.

2. The balancer according to claim 1, wherein the balls include metal particles having a diameter in the range of 0.2 mm to 2.0 mm.

3. The balancer according to claim 2, wherein the body includes a main body which has an opened portion and is formed with the balancing space inside the main body, and a cover which is coupled to the main body to shield the opened portion.

4. The balancer according to claim 3, wherein the bottom portion of the balancing space is formed in a semispherical shape.

5. The balancer according to claim 4, wherein the body is provided with a shaft connecting part having a shaft hole, to which the rotor is connected.

6. The balancer according to claim 5, wherein a shaft hole is formed through the bottom portion of the body, into which a rotating shaft is coupled, and a stopper is inserted into an upper portion of the shaft hole such that the stopper is disposed on the same plane with the bottom portion.

7. The balancer according to claim 6, wherein the bottom portion of the balancing space is coated with diamond-like carbon (DLC) or TEFLON (polytetrafluoroethylene) which has a high lubrication force.

8. A centrifuge which includes an outer case, a damper mounted to a supporting plate formed at an inner surface of the outer case, a motor mounted to a bracket supported by the damper, and a rotor mounted to a rotating shaft of the motor, the rotor having buckets hingedly coupled to the rotor or a plurality of chambers, being characterized in that:

the rotor is provided with a balancer, wherein the balancer includes:

a body which is formed with a balancing space inside the body, the balancing space having a circular circumference, and being defined by a bottom portion, a slanted portion extending upward from the bottom portion, a curved portion formed at an end of the slanted portion, and an upper large-diameter portion extending from the curved portion; and a plurality of balls which are contained in the balancing space, wherein the balancing space is vertically partitioned into multi-layers, and wherein the balls contained in one layer of the balancing space are different in a diameter from the balls stored in another layer of the balancing space such that the diameters of the balls become larger from an uppermost layer to a lowermost layer.

9. The centrifuge according to claim 8, wherein the balls include metal particles having a diameter in the range of 0.2 mm to 2.0 mm.

10. The centrifuge according to claim 9, wherein the body includes a main body which has an opened portion and is formed with the balancing space inside the main body, and a cover which is coupled to the main body to shield the opened portion.

11. The centrifuge according to claim 10, wherein the bottom portion of the balancing space is formed in a semispherical shape.

12. The centrifuge according to claim 11, wherein the body is provided with a shaft connecting part having a shaft hole, to which the rotating shaft is connected.

13. The centrifuge according to claim 12, wherein a shaft hole is formed through the bottom portion of the body, into which the rotating shaft is coupled, and a stopper is inserted into an upper portion of the shaft hole such that the stopper is disposed on the same plane with the bottom portion.

14. The centrifuge according to claim 13, wherein the bottom portion of the balancing space is coated with diamond-like carbon (DLC) or TEFLON (polytetrafluoroethylene) which has a high lubrication force.

* * * * *